Sept. 14, 1926.
R. D. EVANS
1,599,562
ELECTRICAL MEASURING INSTRUMENT
Filed Dec. 17, 1921
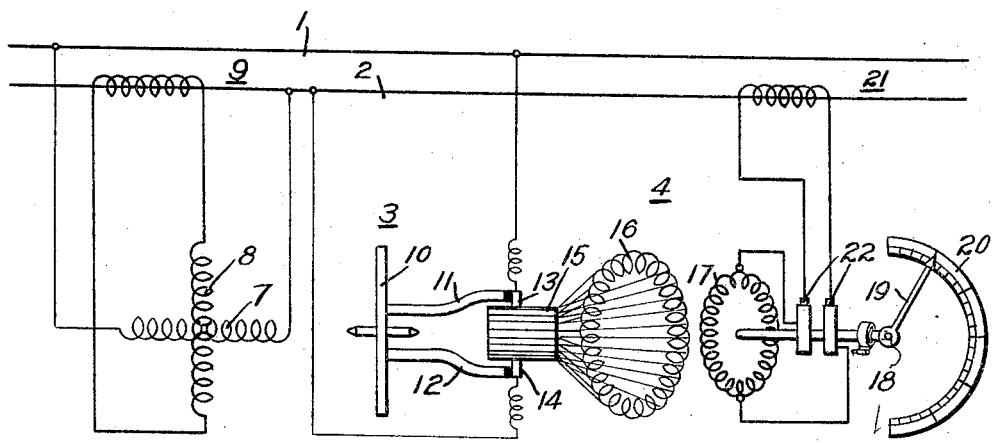
WITNESSES:
INVENTOR
Robert D. Evans
BY
ATTORNEY Patented Sept. 14, 1926.

1,599,562

UNITED STATES PATENT OFFICE.

ROBERT D. EVANS, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed December 17, 1921. Serial No. 522,966.

My invention relates to electric measuring instruments and it has special relation to the measurement of the true value of volt-amperes consumed in a given circuit, irrespective of the power-factor conditions thereof.

One object of my invention is to provide a measuring device comprising an element responsive to power-factor conditions in a predetermined circuit, together with means comprising a plurality of co-operating windings associated with said element to provide an indication of the volt-amperes consumed in said circuit.

Viewed from another angle, the object of my invention is to provide a device including an element that rotates through the angle of lag of the current behind the terminal voltage and to combine with that element a second device whereby an indication proportional to the product of the voltage and the current and taking into account the angle of lag is provided.

Other objects of my invention will become evident from the following detailed description, taken in conjunction with the accompanying drawing, the single figure of which is a diagrammatic view of an electrical measuring instrument and system organized in accordance with my present invention.

Referring to the drawing, the system and apparatus here shown comprises a supply or power circuit including conductors 1 and 2, with which are associated a power-factor-indicating device 3 and a co-operating watt-meter device 4.

The power-factor-indicating device 3 may be of any suitable type, such as that shown in Patent #1,266,604, electrical measuring instruments, issued May 21, 1918, to Paul MacGahan and assigned to the Westinghouse Electric & Manufacturing Company. This device essentially comprises a potential winding 7, which is connected across the supply circuit; a co-operating current winding 8, which is disposed at substantially right angles to the potential winding 7 and is energized from a suitable current transformer 9 that is associated with the supply-circuit conductor 2, for example; and a rotatable magnetizable element or vane 10 which is adapted to assume an angular position corresponding to the angle of lag of the supply-circuit current behind the terminal voltage thereof, as set forth in the above-identified patent.

Attached to the vane 10 are a plurality of arms or rods 11 and 12 that are insulatedly attached to a pair of brushes 13 and 14, respectively, of any suitable type. The brushes 13 and 14 are connected, through suitable flexible conductors, to the respective supply-circuit conductors 1 and 2 and co-operatively bear upon a stationary commutator cylinder 15, which is associated with a stationary winding 16 of ring type, in accordance with a familiar practice.

A rotatable winding 17, which co-operates with the stationary winding 16 of the watt-meter device 4, is suitably mounted upon a rotating shaft or spindle 18, one end of which may be provided with a suitable pointer or indicating finger 19 that plays over an appropriate scale 20. The rotatable winding 17 is energized from a suitable current transformer 21 that is associated with the supply-circuit conductor 2, for example, through a pair of slip rings 22, which are mounted upon the rotatable shaft 18.

The operation of the illustrated apparatus may be set forth as follows: The combined action of the voltage and current windings 7 and 8, respectively, of the power-factor device 3 coact with the rotatable vane or element 10 in such manner that the vane and the movable brushes 13 and 14 assume an angular position corresponding to the phase angle that the current in the supply circuit lags behind the terminal voltage thereof. By reason of the fact that the brushes 13 and 14 are energized from the supply-circuit conductors 1 and 2, it follows that the field set up by the stationary winding 16 of the watt-meter device 4 has a magnitude that is proportional to the line voltage, and a phase position that is dependent upon the indication of the power-factor-indicating device 3. Therefore, the interaction between the fluxes of the stationary winding 16 and the movable winding 17 is such as to produce an indication by the pointer 19 that is proportional to the product of voltage and current irrespective of the phase angle of lag therebetween.

In other words, by measuring the product of voltage and current in the watt-meter device 4 and associating therewith the power-factor-indicating device 3 to shift the phase angle of the field flux in the watt-meter winding 16 into phase with the flux of the supply-circuit current, the direct product of voltage and current, as measured by the interaction of the watt-meter windings 16 and 17, is an indication of the true value of volt-amperes consumed in the supply circuit.

It will be seen that I have thus provided an electrical measuring instrument of a relatively simple character wherein the product of volts and amperes is measured and indicated by a device of the watt-meter type, and this indication is so co-related with a power-factor indication that is provided by another portion of the instrument that the final indication given by the instrument in reality measures the true value of volt-amperes that is consumed in the supply circuit, irrespective of variations in power-factor conditions thereof.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:—

1. A measuring device comprising an element responsive to power-factor conditions in a circuit, wattmeter means comprising a plurality of coils connected to said circuit, a commutator cylinder and brushes being associated with one of said coils, and means governed by said element for shifting said brushes.

2. A measuring device comprising an element responsive to power-factor conditions in a circuit, means comprising a plurality of co-operating coils connected to said circuit, a commutator cylinder and brushes being associated with one of said coils, and means governed by said element for shifting said brushes proportional to the power-factor of the circuit.

3. A measuring device comprising an element responsive to power-factor conditions in a circuit, means comprising a plurality of co-operating windings, a commutator cylinder and brushes being associated with the windings and the circuit, and means actuated by said element for shifting said brushes.

4. A measuring device comprising an element responsive to power-factor conditions in a circuit, means comprising a distributed winding connected to said circuit, a commutator cylinder and brushes being associated with the winding, and means actuated by said element for shifting said brushes proportional to the power-factor of the circuit.

5. A measuring device comprising an element responsive to power-factor conditions in a circuit, means comprising a stationary and a co-operating movable winding energized in accordance with the volts and amperes, respectively, in said circuit, a stationary commutator cylinder and movable brushes being associated with the stationary voltage winding, and means actuated by said element for shifting said brushes.

6. A measuring device comprising an element responsive to power-factor conditions in a circuit, means comprising a stationary and co-operating movable winding energized in accordance with the volts and amperes, respectively, in said circuit, a stationary commutator cylinder and movable brushes being associated with the stationary voltage winding, and means actuated by said element for shifting said brushes through an angle corresponding to the phase difference of the voltage and current in said circuit.

7. A volt-ampere meter for an electric circuit comprising a power-factor-responsive device, a wattmeter device having co-operating windings and a commutator device connected between the circuit and one of the co-operating windings and actuated by the power-factor device for maintaining the phase relation of the currents flowing in said co-operating windings constant.

8. A measuring device for an electric circuit comprising a power-factor-responsive device, a wattmeter device having co-operating windings, a commutator device connected between one of the windings and the circuit and means whereby the power-factor-responsive device actuates the commutator device.

In testimony whereof, I have hereunto subscribed my name this 29th day of November 1921.

ROBERT D. EVANS.